3,035,937
METHOD FOR PRODUCING GLAZES
Earl E. Baldauf and James A. Baldauf, Lake Wales, Fla., assignors to Ceramic Development Corporation, a corporation of Florida
No Drawing. Filed Sept. 16, 1959, Ser. No. 840,225
7 Claims. (Cl. 117—40)

This invention relates to a method of producing fully matured mottled glazes on ceramic ware such as tile and the like and more particularly to a process of producing fully matured mottled glazes which exhibit excellent definition between the contrasting colored portions thereof, and wherein the mottles are lusterless and matte in appearance.

One of the appealing features of a glazed object having a fully matured glaze is the ease with which it may be cleaned, the glazed surface being smooth and free of voids and depressions which would otherwise collect dust, dirt and other foreign particles. To secure the smooth surface which is characteristic of a fully matured glaze the glaze forming materials must be fired at sufficiently elevated temperatures to insure that the glass forming components of the glaze melt and become fluid or semifluid and thereby level out and form a smooth glassy surface which is free of voids and irregularities upon cooling. If the glaze forming materials are underfired, the glass forming components of the glaze fail to melt sufficiently, and a glaze results upon cooling which has an irregular surface. Consequently, unmatured glazes have a light diffusing, dull or matte appearance, and are difficult to clean by reason of the fact that dirt and other foreign particles fill the voids and are not easily dislodged by normal cleaning operations. It is apparent, therefore, that ceramic objects having fully matured glaze coatings are preferred because of the greater ease with which they are cleaned.

Glazes which are matte appearing and which, however, are fully mature, and therefore desirable because of their cleaning qualities, are sometimes produced by incorporating certain known addition agents in the glaze formula. The addition agents produce the matte appearance during the firing of the glaze by a crystallization reaction and, therefore, it is possible to heal over and fully mature the surface of the matte glaze during the firing step of the glaze producing process.

Mottled glazes are more striking in appearance when either the mottles or the base portions of the glazes are matte appearing. These can be obtained by a suitable choice of glass formers and fluxes which prevent the maturity of one or the other portions at the time of firing. However, the glazes are subject to all the disadvantages with respect to cleanliness that are associated with underfired glazes. It is difficult to secure good definition in mottled glazes having a matte portion induced by the use of crystal forming addition agents and yet, on the other hand, fully mature both the mottle portions and the base portions of the glaze in one firing operation since the stains employed in the respective portions tend to bleed from one to the other portion during firing because of the mutually fluid nature of the respective portions at the time of maturing. Consequently, there is need for an effective method of producing a partially matte mottled glaze which is fully matured in one firing operation without encountering such bleeding of the colors from one portion to the other.

Accordingly, a specific object of the invention is to provide a process of producing a fully matured mottled glaze having a matte appearing glazed portion and by which method the bleeding of stains between the different colored portions is practically eliminated.

A general object is to provide a process of producing a fully matured matte glaze.

Another object is to provide a process of producing a fully matured mottled glaze which is characterized by separate applications to a base object of different unfired glaze compositions and by a single firing step, and wherein the glaze produced consists of a matured high matte snowflake-appearing spotty or mottle portions, usually colored white, and a highly lustrous base portion of contrasting color, such as pink, blue, green or other color.

Another object is to provide a process for producing mottled glazes which are fully matured, and which are non-bleeding during the firing step employed in their production.

Matte type glazes may be produced by incorporating small amounts of certain titanates in glass former containing slip formulas employed for coating ceramic articles, and when the titanates are employed for producing matte portions in mottled glazes, particularly mottled white glazes, it has been discovered that they inhibit the bleeding of colors between the contrastingly colored portions of the glaze during the firing thereof. The specific titanates referred to are calcium titanate ($CaTiO_3$), barium titanate ($BaTiO_3$) and zinc titanate ($ZnTiO_3$).

The invention pertaining to the use of the titanates will most particularly be described hereinafter with reference to the production of fully matured matte mottles in mottled glazes which exhibit exceptionally fine definition between the contrasting colored portions thereof and which give the appearance of being snowflakes. It will be apparent, however, that the novel features which are believed to be characteristic of the invention are set forth with particularity in the appended claims, and that the following is set forth only for purposes of illustrating the inventive concept.

In producing a mottled glaze on a ceramic object, such as a bisque tile, the tile is first coated with a slip containing a base glaze composition which includes suitable glass formers, frits, fluxes and stains such as normally incorporated in slips utilized in producing uniformly colored fully matured and preferably high gloss glazes. Typical of such base glaze compositions are those containing such glass formers as feldspar and flint, together with fluxes such as talc, and suitable stains, and suitable glass former and flux containing frits. The base glaze composition may also contain a binder such as Florida kaolin, a hardening agent such as calcium carbonate, and may also include suitable glossing agents such as zinc oxide or barium carbonate and suitable opacifiers such as zirconium silicate.

After the ceramic object has been coated with the base glaze or underglaze composition, a second more highly viscous slip, which contains a top or mottle glaze composition, which includes a titanate, and a glass former that includes free silica, is applied to the tile by splattering with a paint brush or by other suitable means, such as by spraying the slip on the tile in globular form by conventional spray type apparatus. The function of the titanate is two-fold, first to produce or aid in the production of the matte appearance of the mottles and secondly to inhibit the bleeding of the stains between the respective colored portions during firing. The titanates are believed to increase the surface tension of the fluid or semi-fluid glass forming materials of the mottle glaze composition during the maturing step and thereby inhibit the admixture and consequent bleeding of color between the base and mottle portions of the glaze.

It is apparent that the definition between the base and mottled portions of the fully matured glaze will depend on the amount of titanate employed in the formulation of the slip for the top glaze, with better definition occurring through the use of larger amounts of the titanate in the formulation. In practice, it has been found that good matte glaze portions result in the fully matured glazes and that bleeding of colors between the contrastingly colored portions during the firing step is for practical purposes prevented when the amount of titanate incorporated in the top glaze composition ranges from about 23% to 45% by weight of a free silica content of the top glaze composition. By the additional incorporation of small amounts of zirconium oxide with the titanates and glass formers in the top glaze composition, an exceptionally high matte glaze is obtained which has a very pleasing pearly opalescence which in the presence of suitable whiting material gives the appearance of being snowflakes upon the base glaze.

Particularly suitable combinations of ingredients which may be employed in formulating the top glaze composition and which permits the employment of temperatures over a broad temperature range when firing the tiles are those which include the following constituents in the relative range of weight proportions indicated:

| | Parts by weight |
|---|---|
| Feldspar | 40–60 |
| Flint | 2–10 |
| Titanate [1] | 2–10 |
| Zirconium oxide | 4–14 |

[1] Calcium titanate, barium titanate, zinc titanate or any combination thereof.

Top glaze compositions containing these ingredients in the indicated properties may be fully matured by firing at temperature ranges from about 1165° C. to about 1250° C. without bleeding of stains from the base glaze taking place and effectively produce high matte mottled glaze portions.

Of the titanates employed calcium titanate is preferred for the reason that slightly better definition is secured in the mottled glazes than with barium or zinc titanate. The latter, however, are entirely suitable for most applications.

Typical top glaze formulas are illustrated in Table I whereas typical base glaze formulas are illustrated in Table II.

TABLE I.—TOP GLAZE FORMULAS [1]

| Formula | I | II | III | IV |
|---|---|---|---|---|
| Feldspar (glass former) | 266 | 266 | 260 | 52.8 |
| Flint (free silica) (glass former) | 56 | 56 | 60 | 12.9 |
| Florida Kaolin (binder) | 30 | 30 | 34 | 5.9 |
| Titanate (opacifier and non-bleeding agent) | 25 | 25 | 25 | 4.9 |
| Zirconium oxide (opacifier) | 40 | 44 | 40 | 7.6 |
| Calcium carbonate (hardening agent) | 45 | | 45 | 9 |
| Zinc oxide (flux) | 30 | | 32 | 7.8 |
| Lead bisilicate | | | 20 | |
| Approx. firing temp., °C | 1,220 | 1,165–1,180 | 1,250 | 1,165–1,250 |

[1] Proportions of the constituents are reported as parts by weight.

TABLE II.—UNDERGLAZE FORMULAS [1]

| Formula | V | VI | VII |
|---|---|---|---|
| Feldspar (glass former) | 36 | 40 | 40 |
| Flint (glass former) | 11.5 | 24 | 24 |
| Kaolin (binder) | 10.6 | 6 | 6 |
| Calcium carbonate (hardening agent) | 8.4 | 10 | 15 |
| Zinc oxide (opacifier) | 11 | 11 | 6 |
| Barium carbonate (glassing agent) | 2 | 3 | 3 |
| Talc (flux) | | 2 | 2 |
| Zirconium Silicate (opacifier) | 8 | 8 | 8 |
| Glaze stains (coloring agents) [2] | 10 | 10 | 10 |
| Frit [3] | 20.5 | 4 | 4 |
| Approx. firing temperature, °C | 1,140–1,190 | 1,180–1,225 | 1,210–1,250 |

[1] Proportions of the constituents are reported as parts by weight.
[2] Suitable glaze stains may be chromium oxide, tin oxide, vanadium oxide, zirconium oxide, iron oxide, and aluminum oxide.
[3] Composition (weight percent): $SiO_2$—42.6%, $Al_2O_3$—10.8%, $BaO$—17.8%, $CaO$—12.2%, $Na_2O$—4.6%, $K_2O$—12.0%.

In the preparation of the mottled glazes, the respective slips are prepared in the conventional manner. Thus the constituents of each slip are intimately mixed and wet ground to a suitable fineness, as for example, in a ball mill, water being utilized to suspend the ground particles and to function as a carrier for the application of the glaze forming materials to the tile. The slip for the top or mottling glaze is preferably more viscous than the slip for the base glaze and accordingly in prepared by using less water than that used for the underglaze slip. Preferably the top glaze materials of the slip adhere and are applied to the tile in globular form. For example, it has been found that a slip containing the top glaze components is most suitably applied when having a specific gravity of from about 1.9 to about 2.0.

The following example will serve to further illustrate the invention:

Example I

A bisque tile was first coated with underglaze forming materials corresponding in composition and proportions to Formula V of Table II. The slip utilized for the coating was prepared by wet milling the constituents of the formula until a fineness of −200 mesh was secured. The glaze stain utilized was chromium oxide. Thereafter the slip was applied to the tile by spraying from a conventional spray gun.

After the underglaze slip was applied, top glaze forming material corresponding in composition and proportions to Formula II of Table I were applied over the underglaze, the slip being applied in globular form by spraying so as to give a spotty or mottled effect. The slip for the top glaze was prepared by mixing and milling the constituents of the glaze formula in a ball mill utilizing 36.5 lbs. of water per 100 lbs. of the formula materials. After milling to a −200 mesh (Tyler), the specific gravity of the slip was 1.96. The slip was then applied by spraying utilizing an air pressure of about 15 lbs./in.² on the pressure tank containing the slip, and utilizing a very low pressure on the spray gun air nozzle of from about 2 to 10 lbs./in.² The titanate employed in the top glaze was calcium titanate.

After the underglaze and top glaze constituents had been applied to the bisque tile, the coated tile was heated in a kiln at a temperature from about 1160–1170° C. until all portions of the glaze were fully matured. The resulting mottled glazed tile showed no evidence of bleeding between the contrasting colored portions and had a smooth fully matured surface which was free of voids and irregularities. The mottled portion of the glaze, i.e. those corresponding to the areas where the slip containing the top glaze was applied, were dull and exhibited a high matte appearance. The mottles gave the appearance of being snow flakes on the base glaze.

Example II

A mottled glazed bisque tile was prepared in accord with the procedure set forth in Example I, utilizing Formula VI of Table II and Formula I of Table I for the underglaze and top glaze constituents respectively. The stain employed in Formula VI was iron oxide, and the titanate utilized in Formula I was calcium titanate. The coated tile was fired at a temperature of about 1210° C. until the glaze was fully matured.

The glazed tile exhibited excellent definition between the different portions, was smooth and had high matte mottles giving the appearance of being snowflakes on the base glaze portion.

*Example III*

A mottle glazed bisque tile was prepared in accord with the procedure set forth in Example I, utilizing Formula VII of Table II and Formula III of Table I for the underglazed and top glaze material respectively. The stain employed in Formula VII was vanadium oxide, and the titanate utilized in Formula III was calcium titanate. The coated tile was fired at a temperature of about 1250° C. until the glaze was fully matured.

The results were substantially equivalent to those results obtained in Examples I and II.

*Example IV*

A mottled glazed bisque tile was prepared in accord with the procedure set forth in Example I, utilizing Formula VI of Table II and Formula IV of Table I for the underglaze and top glaze constituents respectively. The stain employed in Formula VI was a 50–50 mixture of zirconium and chromium oxides, and the titanate utilized in Formula IV was calcium titanate. The coated tile was fired in the kiln at a temperature from about 1180° C. to 1225° C. until the glaze was fully matured. The results were substantially equivalent to the results obtained in the prior examples.

*Example V*

Barium titanate and/or zinc titanate may be substituted for calcium titanate in any of the prior examples. The resulting mottled tiles will be substantially equivalent to the mottled tiles secured through use of the calcium titanate, except that the definiteness between the different colored portions will be slightly less distinct.

*Example VI*

A mottled glazed bisque tile wherein the mottles are tinted may be prepared in accord with the procedure set forth in Example I by additionally incorporating from 5 to 10 parts of one of the glaze stains set forth at the bottom of Table II in the formula employed in the preparation of the top glaze.

It may be stated that attempts to accomplish the same results by utilizing the oxides of calcium, barium and/or zinc with titanium oxide instead of by the use of calcium, barium and/or zinc titanates have been unsuccessful.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a method of producing a fully matured mottled glaze on an object which includes the coating of said object with a slip containing a stain material and base glaze forming material, the mottled application over said coating of another slip containing glaze forming materials which include free silica, and the firing of said slip coated object thereafter, the improvement comprising mixing from about 23% to 45% of a titanate by weight of said free silica with said glaze forming materials of said other slip prior to the application thereof to said object, said titanate being selected from the group consisting of calcium titanate, barium titanate, zinc titanate and mixtures thereof.

2. The method of producing, on an object, a mottled glaze having good definition between the mottle glaze portions and the base glaze portions comprising, coating said object with a first slip containing glaze forming material and a stain, applying globs of a second slip to said object and over said first slip, said second slip comprising an intimate mixture of the following materials in the amounts indicated:

| | Parts by weight |
|---|---|
| Feldspar | 40 to 60 |
| Flint | 2 to 10 |
| Zirconium oxide | 4 to 14 |
| Titanate | 2 to 10 | said titanate being selected from the class consisting of calcium titanate, barium titanate and zinc titanate, and thereafter firing said slip coated object at a temperature from about 1165° C. to about 1250° C.

3. In a method of producing a fully matured mottled glaze on an object which includes the coating of said object with a slip containing stain and base glaze forming materials, the mottled application over said coat of another slip containing glaze forming materials which include free silica, and the firing of said slip coated object thereafter, the improvement comprising mixing calcium titanate in the amount of from about 23% to 45% by weight of said free silica of said glaze forming materials of said other slip prior to the application thereof to said object.

4. In a method of producing a fully matured mottled glaze on an object which includes the coating of said object with a slip containing stain and base glaze forming materials, the mottled application over said coating of another slip containing glaze forming materials which include free silica, and the firing of said slip coated object thereafter, the improvement comprising mixing barium titanate in the amount of from about 23% to 45% by weight of said free silica of said glaze forming materials of said other slip prior to the application thereof to said object.

5. In a method of producing a fully matured mottled glaze on an object which includes the coating of said object with a slip containing stain and base glaze forming materials, the mottled application over said coat of another slip containing glaze forming materials which include free silica, and the firing of said slip coated object thereafter, the improvement comprising mixing zinc titanate in the amount of from about 23% to 45% by weight of said free silica of said glaze forming materials of said other slip prior to the application thereof to said object.

6. The method of producing, on an object, a mottled glaze having good definition between the mottle glaze portions and the base glaze portions comprising, coating said object with a first slip containing glaze forming material and a stain, applying globs of a second slip to said object and over said first slip, said second slip comprising an intimate mixture of the following materials in the amounts indicated:

| | Parts by weight |
|---|---|
| Feldspar | 40 to 60 |
| Flint | 2 to 10 |
| Zirconium oxide | 4 to 14 |
| Calcium titanate | 2 to 10 | and thereafter firing said slip coated object at a temperature from about 1165° C. to about 1250° C.

7. The method of producing a mottled glazed ceramic object having high definition between the mottled and base glaze portions comprising coating said object with a first slip containing glass forming materials and a stain, thereafter applying globs of a second slip having a greater viscosity than said first slip and a specific gravity of from 1.9 to 2.0 to said coated object, said second slip including the following materials in the amounts indicated:

| | Parts by weight |
|---|---|
| Feldspar | 40 to 60 |
| Zirconium oxide | 4 to 14 |
| Flint | 2 to 10 |
| Titanate | 2 to 10 | said titanate being selected from the group consisting of zinc titanate, calcium titanate, barium titanate and mixtures thereof, and thereafter firing said slip coated object to a temperature from about 1165° C. to about 1250° C.

References Cited in the file of this patent

UNITED STATES PATENTS

| | | |
|---|---|---|
| 506,390 | Claus | Oct. 10, 1893 |
| 1,642,754 | Singer | Sept. 20, 1927 |
| 2,434,079 | Nutting | Jan. 6, 1948 |
| 2,590,894 | Sanborn | Apr. 1, 1952 |
| 2,697,159 | Donahey | Dec. 14, 1954 |

OTHER REFERENCES

"Introduction to the Study of Minerals and Rocks" (Rogers) (page 412 relied on).